United States Patent [19]
Battarel

[11] 3,739,358
[45] June 12, 1973

[54] SHIFT REGISTER OPERATING BY PROPAGATION OF DOMAINS IN THIN FILMS OF MAGNETIC MATERIAL

[75] Inventor: Claude Battarel, Magagnosc De Grasse, France

[73] Assignee: Techniques et Systemes Informatiques, Courbevoie, France

[22] Filed: Jan. 12, 1972

[21] Appl. No.: 217,174

[30] Foreign Application Priority Data

Jan. 14, 1971 France .............................. 7101174

[52] U.S. Cl. 340/174 MC, 340/174 SR, 340/174 TF
[51] Int. Cl. ........................ G11c 19/00, G11c 11/14
[58] Field of Search .............. 340/174 MC, 174 SR, 340/174 TF

[56] References Cited

UNITED STATES PATENTS 3,438,016 4/1969 Spain .......................... 340/174 MC
3,417,385 12/1968 Wolf .......................... 340/174 MC
3,427,603 2/1969 Wolf et al. .................. 340/174 MC
3,474,425 10/1969 Jaecklin ..................... 340/174 MC

*Primary Examiner*—Stanley M. Urynowicz, Jr.
*Attorney*—Richard C. Sughrue et al.

[57] ABSTRACT

A first zone of relatively low coercivity is surrounded by a second zone of relatively high coercivity in a thin film shift register, with the zones formed of magnetizable material, the first zone extending along the axis of relatively difficult magnetization and being divided from the second zone on opposite sides by first and second boundaries in the form of regular saw teeth, with the second axis being displaced relative to the first by half the width of a saw tooth.

20 Claims, 14 Drawing Figures

SHIFT REGISTER OPERATING BY PROPAGATION OF DOMAINS IN THIN FILMS OF MAGNETIC MATERIAL

BACKGROUND OF THE INVENTION

1. FIELD OF THE INVENTION

The present invention concerns a shift register operating by propagation of domains in thin films of magnetic material. In such a register, data passes from an input to an output in the form of the physical propagation of a domain of magnetized material in a thin film of magnetic material. Such registers find application in the construction of high density memories having small overall dimensions.

2. DESCRIPTION OF THE PRIOR ART

Thin film magnetic memories are advantageously used for the storing in relatively small volumes, of relatively high density data, in terms of the number of data bits stored per unit volume of the memory.

There has been previously described a memory operating by propagation of magnetic domains and including as a basic element a shift register in which the advance of data bits is synchronized by means of clock pulses. Such a register consists of a thin layer of magnetic material, generally having a thickness of a fraction of a micron, which has been given an overall magnetization of a given polarity. Each data bit is represented in defined zones of the surface of the film, by magnetic domains of the opposite magnetization.

At the register input, a domain is formed in an input or write-in section, in an operation which is sometimes referred to as "nucleation". The domain advances from one division of the register to the next at a rate determined by the clock pulses, until it reaches an output section in which the appearance of a domain generates a current in a read-out circuit.

In such memories the operations of writing in (nucleation), propagation and reading out, involving electric-magnetic interactions, are carried out by means of electric currents in flat electrical conductors having thickness of source tens of microns.

As is well-known, certain magnetic media, particularly thin films, when treated in the appropriate fashion exhibit an axis of relatively easy magnetization and a perpendicular axis of relatively difficult magnetization. To reverse the magnetization in a direction parallel to the axis of relatively easy magnetization, the applied magnetic field need not be more than a few oersteds.

The previously described practical forms of shift register operating by domain propagation are of two types in one of which the domains propagate along the axis of relatively easy magnetization while in the other of which the propagation is along the axis of relatively difficult magnetization.

In the first type of register, the flat conductors must be so arranged that it is difficult to fold the register and extremely difficult to situate conductors for selecting registers without reducing the data storage density of the memory.

The disposition of the conductors in the second type of register permits the register to be folded, but the propagation of domains requires the application of oblique fields and therefore the use of electrical conductors arranged obliquely to the direction of magnetization. This complicates the positioning of the conductors and makes selection difficult in small registers.

One form of register has been described in which the domains are propagated along zig-zag canals inclined in alternating fashion to one side and the other of the axis of relatively easy magnetization. The drive is obtained by means of a magnetic field directed in alternating manner along the axis of each zig-zag section, and thus obliquely to the axis of easy magnetization. There is thus obtained the effect of data propagation along the axis of relatively difficult magnetization.

There have also been described registers in which the propagation zone has cut-outs, and the resulting demagnetizing fields along the edges require relatively large dimensions, so reducing the maximum available data density.

The complications of construction in the previously described devices prevent the reduction of their prices to values consistent with widespread use in industry.

SUMMARY OF THE INVENTION

The present invention is intended to provide an improved shift register operating by domain propagation along the axis of relatively difficult magnetization.

In accordance with the present invention, there is provided a shift register comprising, on a non-magnetic and electrically insulative base, thin film magnetizable material defining a first zone of relatively low coercivity surrounded by a second zone of relatively high coercivity, the first zone extending along a first axis of relatively difficult magnetization and being divided from the second zone on respective opposite sides by first and second boundaries each in the form of regular saw teeth, each tooth having a first edge perpendicular to the first axis and the other edge at an acute angle to the first edge, the boundaries being symmetrical with respect to the first axis but the second being displaced relative to the first by half the width of a saw tooth.

BRIEF DESCRIPTION OF THE DRAWINGS

The present invention will now be described in more detail, by way of example only, and with reference to the accompanying diagrammatic drawings in which.

DESCRIPTION OF PREFERRED EMBODIMENTS

In the following description, the following terms are to be understood as having the following definition:

K is the uniaxial anisotropic constant;

$M_s$ is the saturation magnetization;

$H_k = 2K/M_s$ is the anisotropic field; and $H_c$ is the coercive field having the threshold value necessary to effect displacement of a domain wall.

Figure 1:
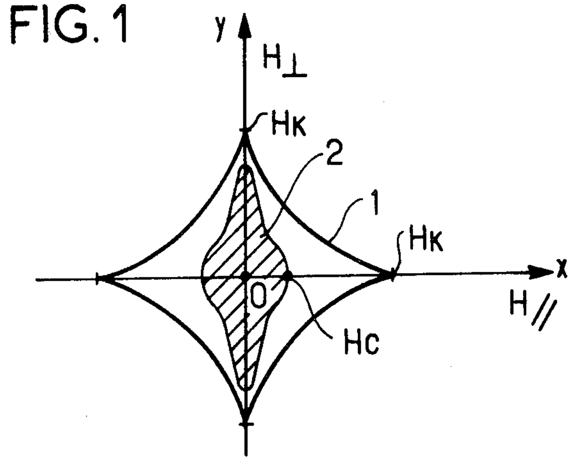
FIG. 1 is a magnetization diagram.

Referring to FIG. 1, the coordinate aces O$x$ and O$y$ respectively define the axis of relatively easy magnetization and that of relatively difficult magnetization. If E is the energy in a uniaxial anisotropic field in the presence of a magnetic field H at an angle $\phi$ to the axis of relatively easy magnetization, and if $\theta$ is the angle of the magnetization with this axis in the equilibrium state, the curve 1 of FIG. 1 is defined by the extremities of a vector H such that $$\delta E/ \delta \theta = \delta^2 E/ \delta \theta^2 = 0$$

For to given applied field H, the magnetization M is parallel to one tangent to the curve 1.

Figure 2:
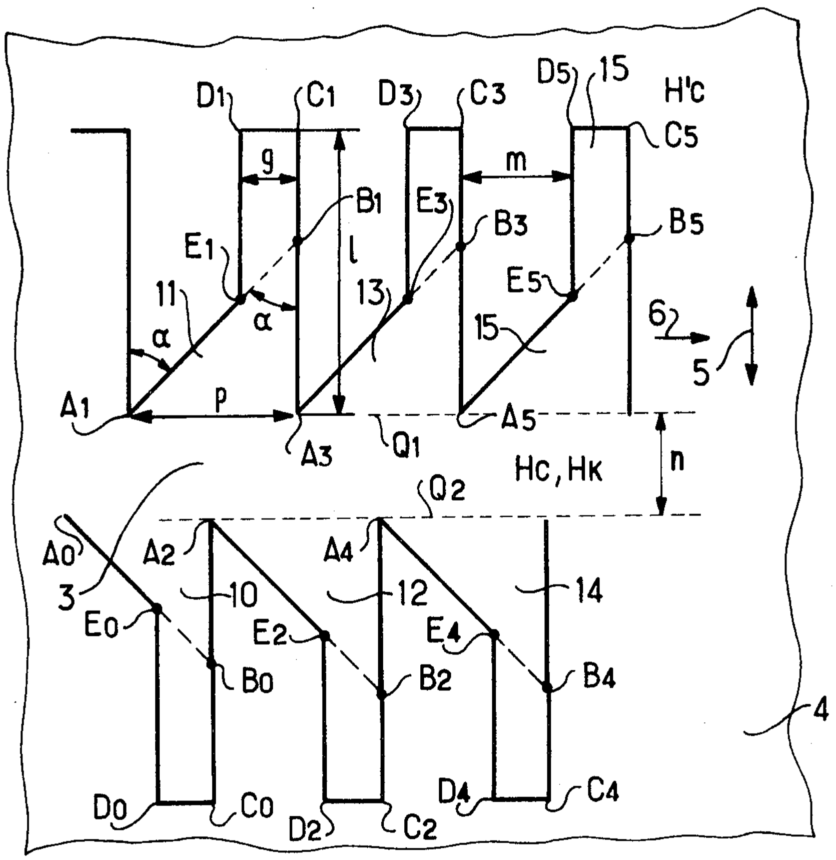
FIG. 2 shows the propagation zone of a shift register.

Curve 1 is an idealization and secondary effects such as dispersion and wall displacement give a real curve shown at 2. diagrammatic FIG. 1, the points of curve 1 lie at the values $H_k$, and the real curve 2 cuts the axis of relatively easy magnetization at values $H_c$. $\delta$ Referring to FIG. 2, a first zone 3 of relatively low coercivity is surrounded by a second zone 4 of relatively high coercivity. The first zone extends along the axis of relatively difficult magnetization, the double-headed arrow 5 showing the perpendicular axis of relatively easy magnetization. The direction of propagation of domains along the first zone 3 is indicated by the arrow 6.

In the first zone 3, $H_c$ has a relatively low value and $H_k$ is of the order of 4 to 6 times more intense. In the second zone 4 a coercive field of the order of twice $H_k$ is obtained by a coupling between a thin layer of relatively low coercivity deposited uniformly over the register substrate and a layer of relatively high coercivity overlying the low coercivity layer except where the latter is exposed to define the first zone 3.

The first zone 3 is divided from the second zone 4 on respective opposite sides by first and second boundaries each in the form of saw teeth including extensions in the form of glove fingers. Thus, the first or upper boundary (as seen in the Figure) is defined by saw teeth 11, 13 and 15 while the second or lower boundary is defined by saw teeth 10, 12 and 14. The saw teeth boundaries are symmetrical with respect to the axis of relatively difficult magnetization, but they are displaced relative to one another parallel to this axis and by half the width of a saw tooth.

Each tooth has a first edge inclined at an acute angle to the axis of the register; a second edge perpendicular to said axis; a third edge parallel to said axis; a fourth edge parallel to said second edge, the end of which is on the same parallel to the axis as the beginning of the first edge. The edge $B_1A_1$ extends at an acute angle to the edge $B_1A_3$. The other sawteeth are similarly defined.

In the particular example shown in this Figure, the angle $\alpha$ has the value of 45°. This angle may, however, have any value between 30° and 70°.

The relative displacement of the two saw tooth boundaries mean that point $A_1$ is midway between points $A_0$ and $B_0$, point $A_2$ midway between points $A_1$ and $B_1$, point $A_3$ is midway between points $A_2$ and $B_2$, aNd so on. The points $A_1$, $A_3$ and $A_5$ lie on a first line $Q_1$ parallel to the axis of relatively difficult magnetization. Points $A_0$, $A_2$ and $A_4$ lie on a parallel line $Q_2$, the perpendicular distance n between line $Q_1$ and $Q_2$ being of the order of one half to twice the "vertical" dimension of a saw tooth, that is to say, the distance $B_1A_3$.

Each sawtooth is extended by means of a trapezoidal region having two edges parallel to "vertical" edge, one being colinear therewith, a third edge coincident with the inclined saw tooth edge, and a fourth edge perpendicular to the parallel edges. Thus, for sawtooth 11, the trapezoidal extension is defined by parallel lines $B_1 C_1$ and $D_1 E_1$, point $E_1$ lying on the saw tooth edge $A_1B_1$. The edge $D_1 C_1$ is parallel to the axis of relatively difficult magnetization. The width g of each trapezoidal extension is of the order of one-third the width p of a saw tooth, the distance m between successive trapezoidal extensions is therefore of the order of two-thirds the width of a saw tooth. The other saw teeth are similarly extended, as shown in the Figure.

The domains pass from one of these extensions to the next, as will shortly be described in more detail. The effect of providing the extensions is to give the domains when stationary a well-defined location and to augment the magnetic stability of the system. This enables the physical dimensions of the register to be reduced, so leading to an increase in the data storage density.

The physical dimensions of the register may be as follows: $g = 12\mu$; $m = 23\mu$; and $p = 35\mu$. The overall "vertical" dimension of each saw tooth with its extension, indicated 1 in the Figure, may be $80\mu$. The space available to each data bit will be of the order of 35 × 200 or $7000\mu^2$. By forming such registers into a memory, data storage density of the order of 10000 bits/cm² may be obtained.

Figure 3A:
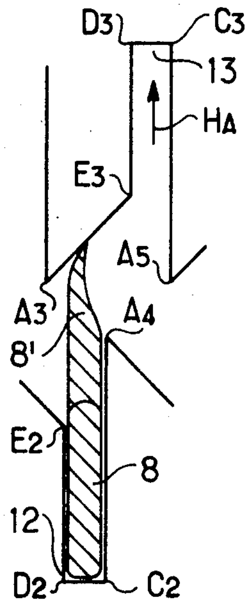
FIG. 3 shows successive stages in the propagation of a magnetic domain along the register.
Figure 3B:
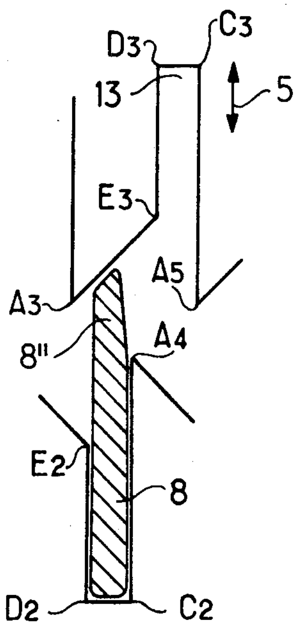
Figure 3C:
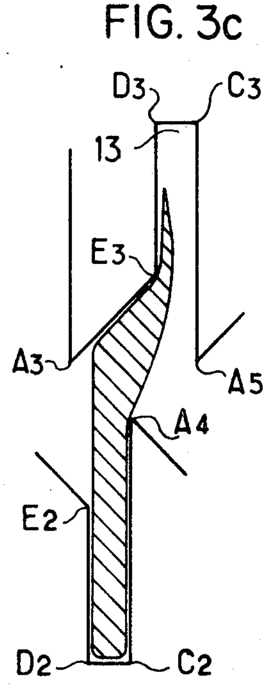
Figure 3D:
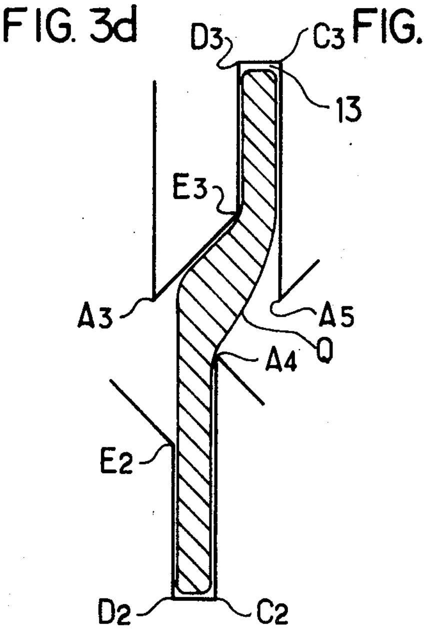
Figure 3E:
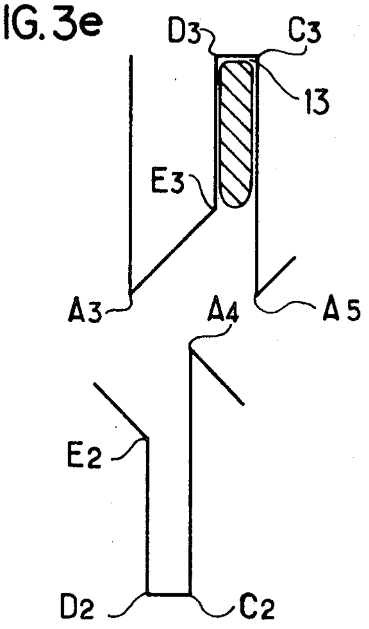
Figure 4A:
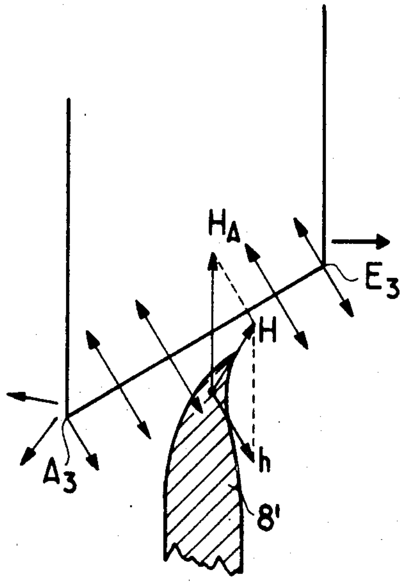
FIG. 4 shows parts of FIG. 3 to a larger scale.
Figure 4B:
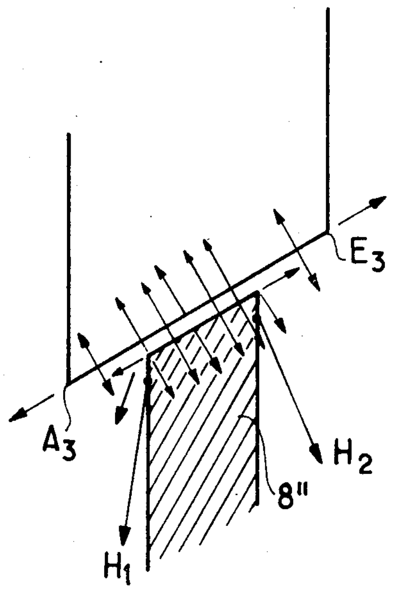
Figure 4C:
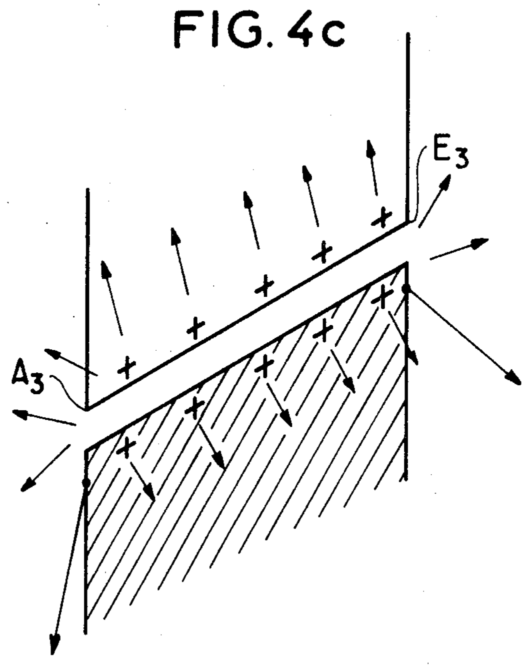

FIG. 3 and 4 show successive stages in the propagation of a magnetic domain along the register, FIGS. 4*a*, 4*b* and 4*c* showing parts of FIGS. 3*a*, 3*b*, and 3*c* to a larger scale. In the remainder of this description, each saw tooth with its trapezoidal extension will be referred to as a division of the register.

FIG. 3*a* shows a domain 8 in division 12 of the register. It is caused to extend upwardly out of this division by the application of a magnetic field of $H_A$ along the axis 5 of relatively easy magnetization. The advancing portion of the domain 8 is shown at 8'.

When the advancing domain reaches the oblique edge A3 E3, it encounters a discontinuity and magnetic poles are generated along the line of separation. As is seen in FIG. 4*a*, the advancing crest of the domain experiences a field H being the resultant of the applied field $H_A$ and the field *h* generated by these poles. This oblique field H directs the crest of the advancing domain towards the right, but the directional effect thus obtained is relatively weak.

For an increased value of the applied field, the walls move to the right and left as shown in FIG. 3*b*. There appear along the uppermost edge of the domain a line of poles which creates a demagnetizing field. On the left-hand edge of the domain the demagnetizing field $H_1$ is almost exactly opposed to the applied field. On the right-hand edge, however, the demagnetizing field $H_2$ is such as to provide a significant resultant field directed towards the right. The induced poles result in a weaker demagnetization energy level to the right than to the left, resulting in a lower coercivity to the right than to the left.

For still further increased value of applied field, which may be termed the passage field, the domain moves to the right along the edge of the high coercivity zone, as is shown in FIG. 3*c*. In this situation, as seen in FIG. 4*c*, two lines of poles of the same polarity are face to face and have an adding effect. The previously obtained directional effect is therefore strengthened and the domain moves in division 13 of the register.

In the region Q shown in FIG. 3*d*, the relatively great curvature of the domain wall is associated with a demagnetizing field which requires the application of a still stronger field for propagation of the domain to continue.

For an excessive value of the applied field, however, the domain would move to the left of point A3, so that the value of the applied field must be limited between the passage field value and this excessive value. Numerical values of these fields will be given later.

The domain now has its leading portion securely in division 13 of the register, but as is clearly seen in FIG. 3d a trailing portion is still in division 12. This portion must be erased, in a fashion to be described shortly, so that at the end of one advanced step the domain lies wholly within division 13 of the register, as shown in FIG. 3e. It will be appreciated from FIGS. 3 and 4 that a unidirectional propagation of the domain from one register division to the next is obtained. The magnetic poles appear on the inclined ridge such that $A_3E_3$ have a double origin; on the one hand, mainly poles are due to the discontinuity of the hard magnetic layer on account of the coupled layer structure, and on the other hand, poles appear on the flattened point of the domain being propagated in the central zone. These poles create a distribution of the demagnetizing field in the low coercivity zone such that the domain leaving the finger E2, D2, C2, B2, although situated at an equal distance from the fingers E1, D1, C1, B1 and E3, D3, C3, B3, can increase only in the direction of the inclined ridge and end up in the finger E3, D3, C3, B3, thus ensuring a unilateral propagation.

Figure 5:
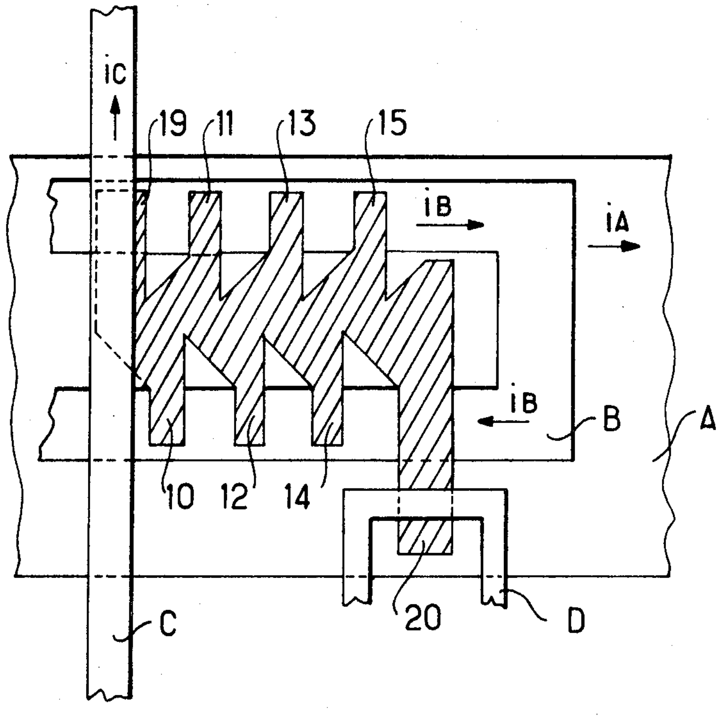
FIG. 5 shows an entire register.

FIG. 5 shows a complete register with divisions 10 to 15 and, at one end, a write-in division 19 with, at the other end, a read-out division 20. Divisions 19 and 20 are preferably wider than the extensions defining divisions 10 to 15.

The register includes means for advancing the domains along the zone of relatively low coercivity, including a flat first electrical conductor A extending parallel to the direction of relatively difficult magnetization, covering the entire zone of relatively low coercivity, and carrying a current $i_A$. This current $i_A$ generates the propagation magnetic field $H_A$ aligned with the axis of relatively easy magnetization. The polarity of this current periodically changes, as will be more fully described below.

A generally U-shaped and flat second electrical conductor B embraces the zone of relatively low coercivity with its arms extending parallel to the axis of relatively easy magnetization. One arm of the U-shape covers the extensions of division 11, 13 and 15 while the other covers those of division 10, 12 and 14. It carries a current $i_B$ whose polarity is periodically reversed and which is shown in FIG. 5 as passing from left to right in the upper arm and from right to left in the lower arm.

A third electrical conductor C extends perpendicularly of the axis of relatively easy magnetization to cover the write-in section 19 of the register. It carries a write-in current $i_C$ to generate a magnetic field which, in combination with the applied field $H_A$ along the axis of relatively easy magnetization, creates a nucleation by magnetization along an oblique axis.

A fourth conductor D covers the end portion of read-out division 20 of the register and receives a current pulse when a domain appears in that division.

Conductor A preferably has a thickness of the order of 6$\mu$ and conductors B, C and D thicknesses of the order of 3$\mu$. The conductors are electrically insulated from one another by a film of a polyamide, suitably having a thickness of 66$\mu$. A suitable film is available from the Company Du Pont de Nemours under the name "Pyre ML."

Figure 6:
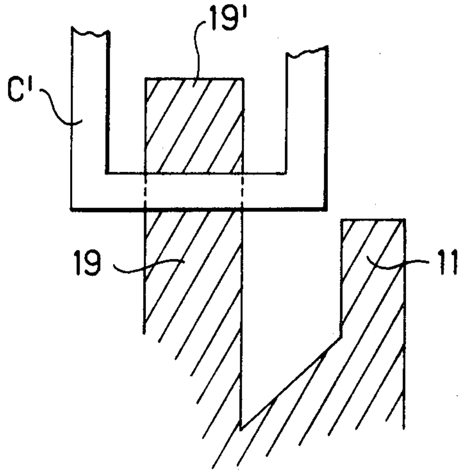
FIG. 6 shows a first modification to the register of FIG. 5.

FIG. 6 shows a modified arrangement for writing data into the register, consisting of an extension 19' to write-in section 19 over which passes a write-in conductor C'.

An alternative read-out arrangement (not shown) could make use of the longitudinal or transverse magnetoresistance of the magnetic layer itself or in a layer of a magnetic or semi-conductive material disclosed closely adjacent the magnetic layer in the region of the read-out division thereof.

Figure 7:
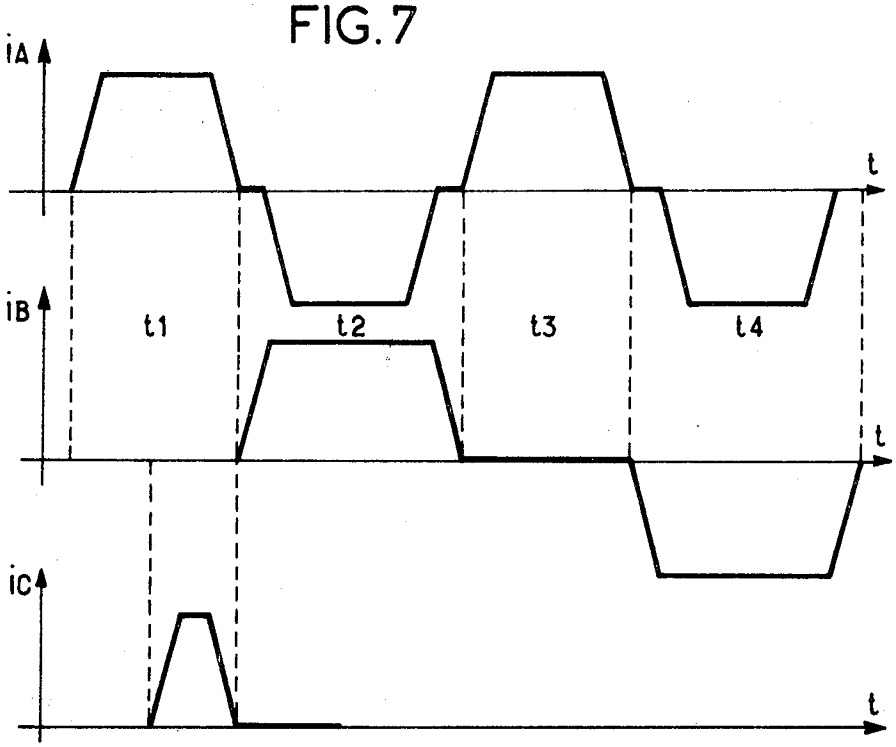
FIG. 7 is a diagram referred in the explanation of the operation of the register.

FIG. 7 shows the wave forms of current $i_A$, $i_B$ and $i_C$ during four successive time intervals $t_1$, $t_2$, $t_3$ and $t_4$.

In interval $t_1$, a domain is nucleated in the write-in section of the register by the simultaneous application of the propagation field and a write-in field. The conductor A receives current $i_A$ in a first sense to generate a field whose strength lies between the passage value and the excessive value previously referred to. The domain generated by this field combination fills divisions 19 and 10 of the register.

In interval $t_2$, conductor A passes a current with the opposite polarity. This would tend to erase the domain previously formed, but at the same time conductor B passes a current $i_B$ whose polarity is such as to oppose this erasure in division 10. Since the current $i_B$ flows in the other sense over division 19, the upper portion of the domain is erased to leave the domain occupying only division 10.

In interval $t_3$, the current $i_A$ in conductor A flows in the same sense as in interval $t_1$. The domain from division 10 is therefore extended into division 11, without leaving division 10, however.

In interval $t_4$, the current $i_A$ flows in the opposite sense and the current $i_B$ in conductor B flows in the sense opposite to that interval $t_2$. That portion of the domain in division 10 is therefore erased, to leave the domain occupying only division 11.

It will be appreciated that as these operations are carried out simultaneously on all register divisions, the device operates as a classical shift register.

Figure 8:
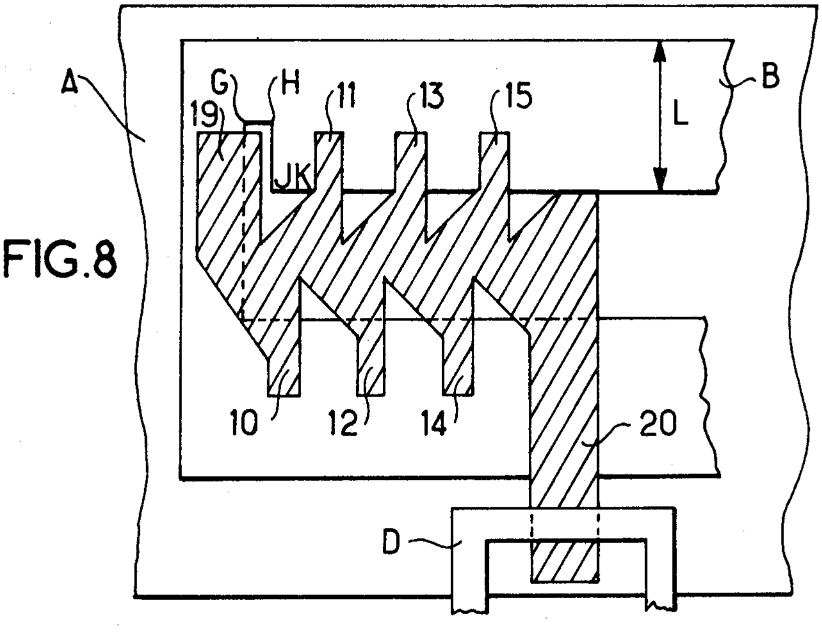
FIG. 8 shows a second modification to the register of FIG. 5.

In FIG. 8, elements common to FIG. 5 have the same reference numerals. In the modified register shown in FIG. 8, the write-in conductor is dispensed with, its place being taken by part of the conductor B. This is achieved by inverting the conductor B from the position shown in FIG. 5 to that shown in FIG. 8, with the portion linking the parallel arms extending over the write-in section 19 of the register.

To nucleate a domain in register division 19, the current $i_B$ is driven through the conductor B at the same time as a current $i_A$ in conductor A. The current $i_B$ superimposes on the propagation field a field which is parallel to the axis of relatively easy magnetization, except in the write-in section 19 where the field generated by the current $i_B$ is parallel to the axis of relatively difficult magnetization.

The upper left corner of the conductor B, as seen in the Figure, has a cut-out providing an edge GH so that the current $i_B$ in this region is parallel to the axis of relatively easy magnetization. The edge HJ of the cut-out is advantageously of the order of L/2 where L is the width of the conductor B.

In FIGS. 5 and 8 has been shown a single write-in arrangement and a single read-out arrangement. It will be appreciated that multiple read-out and write-in stations may be provided by means of arrangements generally similar to those described.

The relatively low coercivity material may have, for example, values of $H_c$ and $H_k$ of the order of 4 oersteds and 20 oersteds respectively.

The relatively high coercivity material may have a coercive field as high as 400 Oe. By coupling the two layers of material, the coercivity $H_c$ of 4 Oe may be increased to a value $H_c'$ of 40 Oe.

With the values and geometrical dimensions previously enumerated, the passage field has a value of the order of 5 Oe and the excessive value which must be avoided is of the order of 8 Oe.

The control current pulses may be of the order of 0.1 A for the inhibition current $i_B$ and 0.5 A for the propagation current $i_A$.

The material of relatively low coercivity is suitably a ternary alloy of iron, nickel and cobalt. The alloy suitably includes from 50 to 70 percent nickel, 5 to 25 percent iron and 10 to 30 percent cobalt. The most preferable proportion of cobalt is in the range 20 to 25 percent. One suitable composition is, for example, 62 percent nickel, 15.5 percent iron and 22.5 percent cobalt. For such an alloy, the values $H_c$ and $H_k$ are virtually independent of thickness for values between 850 and 1100 Angstrom units. The thickness of the relatively low coercivity material is therefore advantageously in this range.

This first film may be deposited by evaporation in vacuo onto a glass substrate. These is thus obtained a polycrystalline film having crystalline anisotropic and residual magnetostriction coefficients which are relatively low.

The deposition is effected in the presence of a constant magnetic field which produces a magnetic orientation in one direction, the axis of relatively easy magnetization.

The relatively high coercivity layer may be obtained in various ways. Widely used methods for forming thin film memories involve the increasing of the coercive field by the deposition of aluminum layers or by areas of bare glass constituting the low coercivity zone. Other methods involve the coupling of the relatively low coercivity layer to a layer of very high coercivity in the form of a film of cobalt and phosphorus with a thickness of more than 1000 Angstrom units, using photoresist or selective deposition of metal.

It has been found that best results are obtained in the present invention using a cobalt-phosphorous layer of 800 Angstrom units thickness coupled to a cobalt-nickel-iron layer of 1000 Angstrom units thickness.

What is claimed is:

1. A shift register on a non-magnetic and electrically insulative base, said register comprising: thin film magnetizable material defining a first zone of relatively low coercivity surrounded by a second zone of relatively high coercivity, said first zone extending in the direction of the axis of relatively difficult magnetization and being divided from the second zone on respective opposite sides by first and second boundaries each boundary being formed by periodically repeating divisions comprising a first segment at an acute angle with respect to said axis, a second segment perpendicular to said axis, a third segment parallel to said axis and a fourth segment perpendicular to said axis wherein one of the end points of said first and fourth segments lie along a line parallel to said axis, said boundaries being symmetrical with respect to the axis but the second displaced relative to the first along the axis by the distance to the mid-point of the first segment.

2. The register as claimed in claim 1, in which the second zone material is an alloy of cobalt and phosphorous partially overlying the first zone and having a thickness of from 500 to 800 Angstrom units.

3. The register as claimed in claim 1 wherein the line parallel to said axis for said first and second boundaries are separated by a distance in the order of one-half to twice the length of said first segment.

4. The register as claimed in claim 3 wherein the distance between the second and fourth segments is of the order of one-third the length of said first segment.

5. The register as claimed in claim 1 wherein the distance between the second and fourth segments is of the order of one-third the length of said first segment.

6. The register as claimed in claim 5 wherein the distance between said second and fourth segments is twelve microns, the length of said fourth segment is eighty microns, and the length of the projection of the first segment on said axis is twenty-three microns.

7. The register as claimed in claim 6 including means for advancing domains of magnetized material along the first zone from a division of one of said boundaries to the adjacent division of the other of said boundaries, said means comprising a first flat electrical conductor extending along the first zone parallel to the axis and a flat second electrical conductor of generally U shape embracing the first zone with its arms extending parallel to the axis.

8. The register as claimed in claim 1 including means for advancing domains of magnetized material along the first zone from a division of one of said boundaries to the adjacent division of the other of said boundaries, said means comprising a first flat electrical conductor extending along the first zone parallel to the axis and a flat second electrical conductor of generally U shape embracing the first zone with its arms extending parallel to the axis.

9. The register as claimed in claim 8, comprising a write-in section formed as one end of the first zone, the second conductor being so arranged that that portion linking its arms extends perpendicularly of the axis to cover the write-in section.

10. A register as claimed in claim 8, comprising a write-in section formed as one end of the first zone and a third electrical conductor extending perpendicularly of the axis to cover the write-in section.

11. The register as claimed in claim 10, comprising a write-in section formed as one end of the first zone, the second conductor being so arranged that that portion linking its arms extends perpendicularly of the axis to cover the write-in section.

12. The register as claimed in claim 1, wherein: the material of the first zone is a ternary alloy of iron, nickel and cobalt including from 50 to 70 percent nickel, 5 to 25 percent iron and 10 to 30 percent cobalt.

13. The register as claimed in claim 12, in which the alloy contains 62 percent nickel, 15.5 percent iron and 22.5 percent cobalt.

14. The register as claimed in claim 13, in which the thickness of the material of the first zone is between 850 and 1100 Angstrom units.

15. The register as claimed in claim 14, in which the second zone material is an alloy of cobalt and phosphorous partially overlying the first zone and having a thickness of from 500 to 800 Angstrom units.

16. The register as claimed in claim 1, wherein said acute angle is between 20 and 60 degrees.

17. The register as claimed in claim 16 wherein the distance between the second and fourth segments is of the order of one-third the length of said first segment.

18. The register as claimed in claim 16 wherein the line parallel to said axis for said first and second boundaries are separated by a distance in the order of one-half to twice the length of said first segment.

19. The register as claimed in claim 18 including means for advancing domains of magnetized material along the first zone from a division of one of said boundaries to the adjacent division of the other of said boundaries, said means comprising a first flat electrical conductor extending along the first zone parallel to the axis and a flat second electrical conductor of generally U shape embracing the first zone with its arms extending parallel to the axis.

20. The register as claimed in claim 18 wherein the distance between the second and fourth segments is of the order of one-third the length of said first segment.

* * * * *